United States Patent [19]

Allan

[11] 3,737,035
[45] June 5, 1973

[54] APPARATUS FOR CLEARING THE SCREEN OF CROP-HARVESTING PRODUCT

[75] Inventor: George Allan, Peterborough, England

[73] Assignee: FMC Corporation, San Jose, Calif.

[22] Filed: Aug. 20, 1970

[21] Appl. No.: 65,421

[30] Foreign Application Priority Data
Aug. 20, 1969 Great Britain.....................41,459/69

[52] U.S. Cl...................................209/380, 209/299
[51] Int. Cl. ..............................................B07b 1/50
[58] Field of Search......................209/380, 383, 384, 209/388, 299, 294, 295, 298

[56] References Cited

UNITED STATES PATENTS

| 139,585 | 6/1873 | La Croix | 209/380 |
| 160,080 | 2/1875 | Brown | 209/380 X |
| 1,313,145 | 8/1919 | Westad | 209/380 |
| 2,751,079 | 6/1956 | Aulmann | 209/380 X |
| 2,839,970 | 6/1958 | Gaffney | 209/380 |
| 3,351,200 | 11/1967 | Burenga | 209/299 |
| 3,143,493 | 8/1954 | Anderson | 209/380 X |

FOREIGN PATENTS OR APPLICATIONS

| 3,861 | 11/1874 | Great Britain | 209/380 |
| 664 | 2/1880 | Great Britain | 209/380 |
| 110,773 | 5/1944 | Sweden | 209/380 |

*Primary Examiner*—Frank W. Lutter
*Assistant Examiner*—Robert Halper
*Attorney*—Francis W. Anderson and C. E. Tripp

[57] ABSTRACT

A pea viner comprises a screen drum for separating the crop, which passes through the drum, from the unwanted parts of the plant. The drum is cleaned, to prevent clogging, by jets of pressurized gas directed through the drum.

2 Claims, 3 Drawing Figures

Patented June 5, 1973

INVENTOR
GEORGE ALLAN
BY
Mason, Mason & Albright
ATTORNEYS

Patented June 5, 1973

INVENTOR
GEORGE ALLAN
BY
Mason, Mason & Albright
ATTORNEYS

APPARATUS FOR CLEARING THE SCREEN OF CROP-HARVESTING PRODUCT

BACKGROUND OF THE INVENTION

1. Field of the Invention

This invention relates to the separating of a crop from the unwanted parts of a plant. More particularly but not exclusively the invention relates to the separation of peas or other pulses from the unwanted parts of a leguminous plant.

2. Description of the Prior Art

Apparatus has been used in which the required crop, for example peas, is separated from unwanted parts of plants by means of a rotary member on which is mounted a plurality of beaters which burst the hulls by impact and by means of a mesh screen through which the crop and only smaller parts of the unwanted plant material can pass. Clearly, it is desirable to use a fine mesh so as to re-strict the passage of as much as possible of the unwanted plant material, but in practice, a fine mesh clogs rapidly with the unwanted plant material, and a compromise has to be reached in the mesh selected.

It has already been proposed in the U.S. Patent to Burenga, No. 3,351,200, Nov. 7, 1967, to provide rotary brushes extending parallel to the axis of the rotary member, but these brushes can be used only when the machine is temporarily stopped, such intermittent stoppages, which may be required at intervals of 20 minutes or less in adverse conditions is clearly inconvenient, because high active utilization of the pea viner or other apparatus is important during the short harvesting season. The use of a brush is thus inconvenient and is, moreover, to a greater or lesser extent, ineffective under very wet conditions.

According to the present invention, there is provided in apparatus for separating pulses from the unwanted part of a leguminous plant including a rotary screen drum, the improvement comprising a plurality of nozzles on an axially reciprocable pipe and spaced along the length of said screen drum externally thereof and operable to direct a pressurized gas against said screen drum whereby to clean said screen drum, and means for moving said pipe and nozzles axially of said screen drum, whereby to clean substantially the whole length of said screen drum.

The nozzles at the discharge end of the screen (where the vines are meshing) are constructed to deliver more air than those at the receiving end. The pipe is reciprocated by a gear box driving an endless chain. A slotted bracket on the pipe receives a pin connected to the chain.

BRIEF DESCRIPTION OF THE DRAWINGS

An embodiment of the present invention will now be described, by way of example only, with reference to the accompanying diagrammatic drawings, in which.

DESCRIPTION OF THE PREFERRED EMBODIMENT

Figure 1:
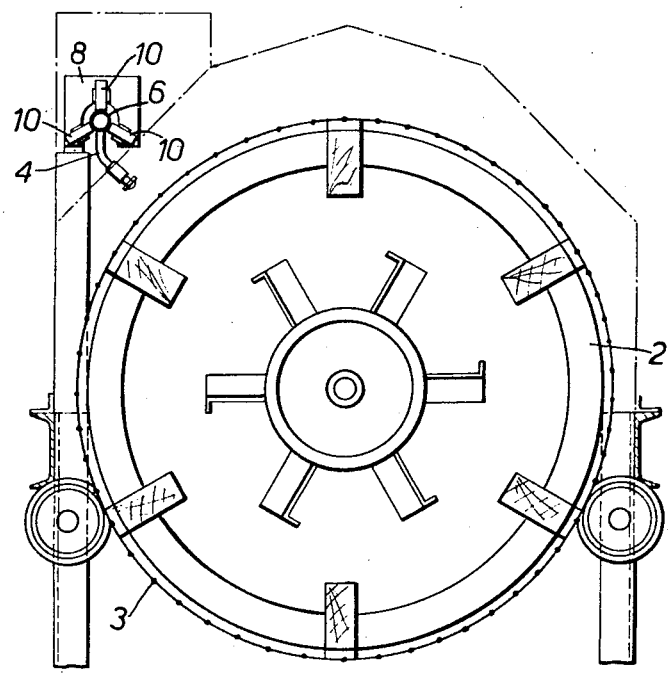
FIG. 1 is an end elevation, in section, of the upper portion of a pea viner in accordance with the present invention.
Figure 2:
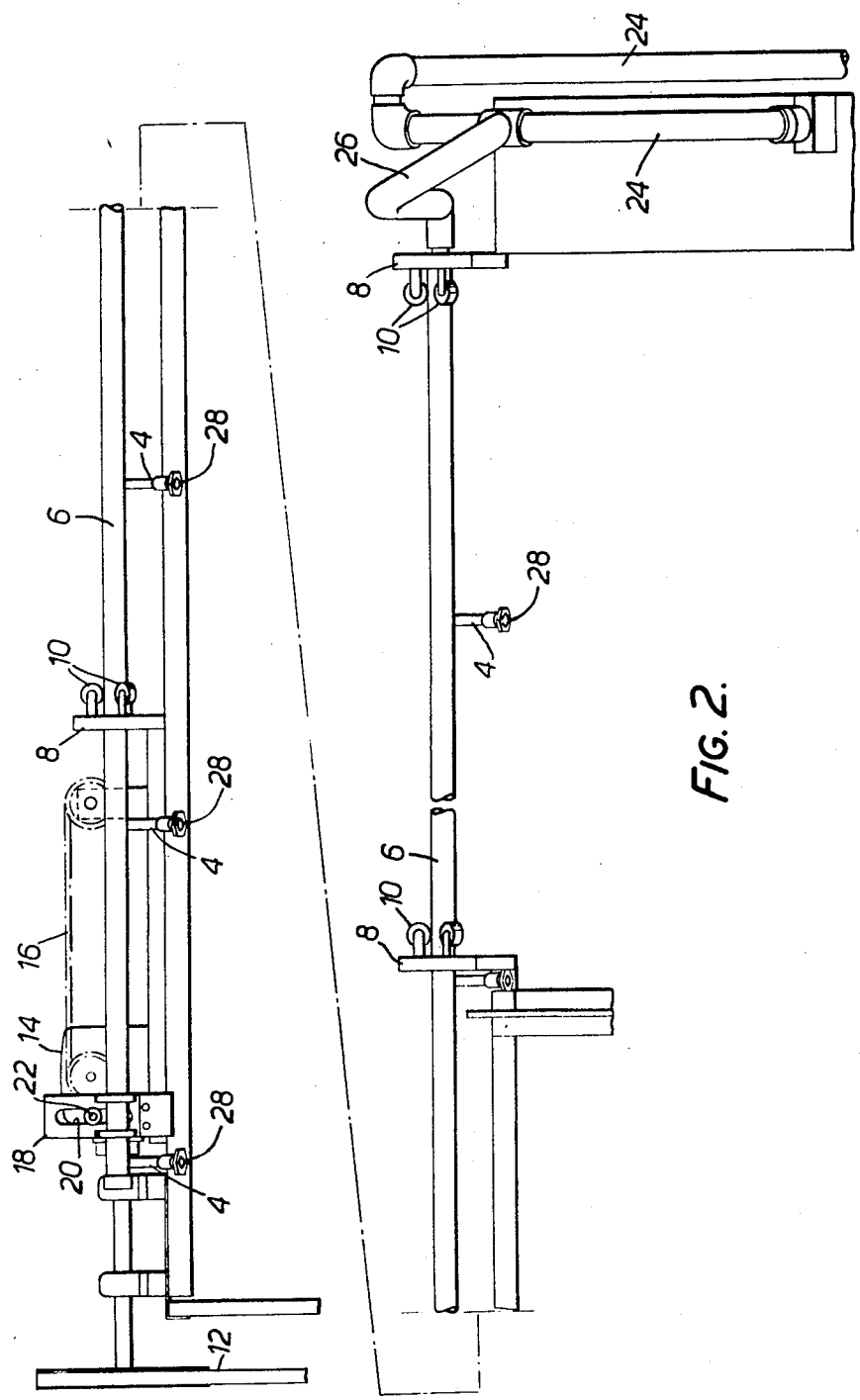
FIG. 2 is a side elevation of the pea viner, shown in FIG. 1, a screen drum of the viner being omitted for the sake of clarity.
Figure 3:
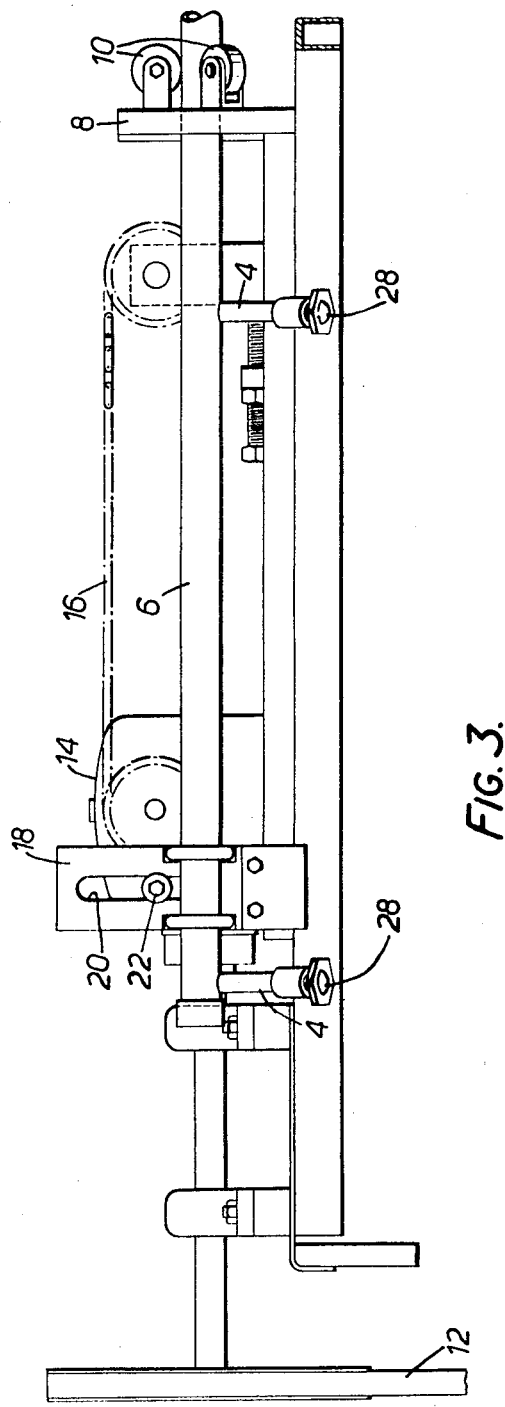
FIG. 3 is a side elevation, to an enlarged scale, showing in greater detail a reciprocating drive system for an air supply pipe of the viner.

There is shown in the drawings a pea viner which includes a rotary screen drum 2 comprising a number of screens 3 and beaters for opening pea hulls, the peas passing through the drum 2. Such a pea viner which has been in use for a number of years is described in the aforesaid U.S. Pat. No. 3,351,200 and no detailed description thereof will be given herein.

In order to prevent the screens 3 from becoming clogged, a series of evenly spaced nozzles 4 is arranged in a line outside and approximately at a 10 o'clock position in relation to the screens 3 so that they discharge along the whole length of the screens 3, a blast of compressed air through the screens at a pressure of approximately 90 lb./square in. To ensure that the whole of each screen is subjected to an adequate blast of fresh air, the air supply pipe 6 carrying the nozzles 4 is slowly reciprocated axially of the screen drum 2.

Slide bearings 8 are spaced along the length of the screen drum 2 and are secured to a stationary surrounding framework thereby to support the air supply pipe 6. Each slide bearing 8 comprises three rollers which are displaced by 120° about the axis of the pipe 6. Reciprocatory motion is provided by a take-off drive 12 of the main power source of the machine acting through a worm gear 14 the output of which drives a chain 16. The pipe carries a trunnion or other projection 18 which engages by a slot 20 thereof on a pin 22 secured to one link of the chain 16. The chain 16 reciprocates the pipe 6 with a stroke of at least one half of the spacing between the nozzles 4. Preferably the stroke of the pipe 6 is substantially equal to the spacing between the nozzles. The whole of the length of the screens is thereby subjected to a blast of compressed air. Compressed air is fed into the supply pipe 6 from a source (not shown) via conduits 24 mounted on the surrounding framework. The conduits 24 communicate with an end portion of the pipe 6 by means of a flexible hose 26.

Because those portions of the screens which are remote from the intake, receive in operation, plant material which is in a particularly mushy condition, the tendency for the plant material to clog the screens is increased. To counteract this increased clogging, the amount of air discharged through nozzles 4 at these end portions is higher than that discharged over the remaining portions of the screens. The nozzles 4 include slotted discs (not shown) which produce a flow of compressed air of corresponding cross-section, at least over an initial part of the discharge path. The discs are each held in position by an open ended, flanged and screwed cap 28. In one example, two nozzles adjacent the intake of the screen drum have slots dimensioned one-sixteenth by one-half inch and four remaining slots are dimensioned one-eighth by one-half inch. These dimensions have been found satisfactory in practical use at a pressure of 90 lb./sq.in. derived from a compressor having a 120 cu.ft./min. capacity under normal operating conditions and from a compressor having a capacity of 240 cu.ft./min. under wet conditions.

It will be appreciated that the present invention can be applied not only to newly constructed apparatus but also to existing apparatus since the number of modifications required is small. Thus, in apparatus using brushes, it is possible to remove the brushes, replace them by the pipe carrying the nozzles and to provide the reciprocating motion by the original brush drive.

Although the reciprocating drive for the compressed air supply pipe 6 has been described as mechanical, the power could be provided by compressed air or by electricity. Also, many different forms of mechanism could be employed to provide the longitudinal reciprocating motion. The latter is slow, the movement being just visible from inspection when the apparatus is in operation.

The construction herein proposed enables a pea viner to be operated continuously, because the continuous air supply through the nozzles 4 keeps the screens 3 free of obstruction at all times. For the same reason it is possible to reduce the mesh size of the screens, since there is no need to make allowance for clogging. Further, the peas as taken from the apparatus are substantially cleaner, that is with a reduced proportion of the unwanted plant material.

What is claimed is:

1. In a leguminous plant harvester of the type comprising a rotating drum screen for receiving the vines and attached crop at one end of the drum and discharging vines and trash at the other end, beaters in the drum and means for cleaning the screen; the improvement wherein said screen cleaning means comprises an external, closed end air pipe running parallel to the screen axis at an upper portion of the drum screen, means mounting said pipe for axial reciprocation along said drum screen, a plurality of spaced air nozzles depending directly from said air pipe, said nozzles being directed toward said drum screen along its length, those nozzles disposed at the material discharge end of the drum screen having larger apertures than those at the material receiving end of the drum screen, means for reciprocating said air pipe axially of the screen by a distance of at least one half of and not substantially greater than the spacing between adjacent nozzles, and a flexible hose connected to the other end of the pipe for supplying compressed air thereto.

2. In a leguminous plant harvester of the type comprising a rotating drum screen for receiving the vines and attached crop at one end of the drum and discharging vines and trash at the other end, beaters in the drum and means for cleaning the screen; the improvement wherein said screen cleaning means comprises an external, closed end air pipe running parallel to the screen axis at an upper portion of the drum screen, means mounting said pipe for axial reciprocation along said drum screen, a plurality of spaced air nozzles depending directly from said air pipe, said nozzles being directed toward said drum screen along its length, and means for reciprocating said air pipe comprising a gear reduction driven from the harvester, an endless member driven by said gear reduction and having reaches parallel to said pipe, a slotted bracket on said pipe, and a pin on said endless member riding in the slot in said bracket.

* * * * *